United States Patent
Brothers et al.

(10) Patent No.: US 11,875,137 B2
(45) Date of Patent: Jan. 16, 2024

(54) METHOD AND APPARATUS FOR ADDING NEW INLINE PROMPTS TO A PROGRAM DEVELOPMENT ENVIRONMENT

(71) Applicant: Texas Instruments Incorporated, Dallas, TX (US)

(72) Inventors: Malgorzata Anna Brothers, Plano, TX (US); Harshal S Chhaya, Plano, TX (US); Pedro Edyvan Hernandez, Aguascalientes (MX); Michael Georges Stella, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 19 days.

(21) Appl. No.: 17/223,386

(22) Filed: Apr. 6, 2021

(65) Prior Publication Data
US 2022/0179624 A1    Jun. 9, 2022

Related U.S. Application Data

(60) Provisional application No. 63/122,395, filed on Dec. 7, 2020.

(51) Int. Cl.
G06F 8/33        (2018.01)
G06F 3/0482   (2013.01)

(52) U.S. Cl.
CPC .............. *G06F 8/33* (2013.01); *G06F 3/0482* (2013.01)

(58) Field of Classification Search
CPC ..... G06F 8/33; G06F 8/34; G06F 8/38; G06F 3/0482; G06F 9/44526
See application file for complete search history.

(56) References Cited

U.S. PATENT DOCUMENTS

| | | | | |
|---|---|---|---|---|
| 6,314,559 B1 * | 11/2001 | Sollich | ...................... | G06F 8/33 717/111 |
| 7,197,744 B2 * | 3/2007 | Hostettler | ................. | G06F 8/33 717/125 |
| 7,526,753 B2 * | 4/2009 | Spencer | ..................... | G06F 8/71 717/109 |
| 8,671,387 B2 * | 3/2014 | Quine | ....................... | G06F 8/00 717/109 |
| 8,776,010 B2 * | 7/2014 | Fisher | ....................... | G06F 8/33 717/110 |
| 9,170,782 B2 * | 10/2015 | Carter | ....................... | G06F 8/33 |
| 9,430,194 B1 * | 8/2016 | Childs | ........................ | G06F 8/33 |
| 10,255,045 B2 * | 4/2019 | Drukman | ................... | G06F 8/31 |

(Continued)

OTHER PUBLICATIONS

SSDN, "What is Python Programming Language—Benefits and Uses of Python," Aug. 13, 2019, Available http://web.archive.org/web/20190813143309/https://www.ssdntech.com/blog/about-python-language/ (Year: 2019).*

(Continued)

*Primary Examiner* — Alvin H Tan
(74) *Attorney, Agent, or Firm* — Charles F. Koch; Frank D. Cimino

(57) ABSTRACT

A method for Python programming on a handheld device is provided that includes installing a module in a Python development environment on the handheld device, wherein the module includes a definition of a new inline prompt, and adding the new inline prompt to a plurality of pre-defined inline prompts included in the Python development environment.

25 Claims, 10 Drawing Sheets

(56) References Cited

U.S. PATENT DOCUMENTS

| | | | | |
|---|---|---|---|---|
| 10,691,420 B1* | 6/2020 | Breslau | ...................... | G06F 8/34 |
| 2004/0252122 A1* | 12/2004 | Rothman | .............. | G06F 40/109 |
| | | | | 345/467 |
| 2007/0044066 A1* | 2/2007 | Meijer | ...................... | G06F 8/33 |
| | | | | 717/114 |
| 2013/0263086 A1* | 10/2013 | Carter | ...................... | G06F 8/33 |
| | | | | 717/113 |
| 2016/0111018 A1* | 4/2016 | Sousa | ...................... | G06F 8/33 |
| | | | | 434/118 |
| 2022/0019411 A1* | 1/2022 | Cockrell | ................... | G06F 8/33 |

OTHER PUBLICATIONS

Stephen Lindor Reid, "Argument Helper for Python Program Editor", U.S. Appl. No. 17/017,634, filed Sep. 10, 2020, pp. 1-28.

* cited by examiner

METHOD AND APPARATUS FOR ADDING NEW INLINE PROMPTS TO A PROGRAM DEVELOPMENT ENVIRONMENT

CROSS-REFERENCE TO RELATED APPLICATIONS

This application claims benefit of U.S. Provisional Patent Application No. 63/122,395 filed Dec. 7, 2020, which is incorporated herein by reference in its entirety.

BACKGROUND

The Python programming language is becoming important in the field of education as a learning tool for algorithmic thinking and for developing programming skills of students. Further, a version of Python, referred to as Micro-Python, has been adapted to run on various handheld devices used in the classroom, e.g., graphing calculators such as the TI-83 Premium CE graphing calculator and the TI-Nspire® CX II graphing calculator from Texas Instruments Incorporated, allowing students to develop programs and use built-in Python functions on such devices. As students are learning to develop Python programs and to use built-in Python functions on handheld devices, it is important that they are aware of what inputs are valid as providing an incorrect value can cause a runtime error or invalid operation of a program.

SUMMARY

Embodiments of the present disclosure relate to methods and apparatus for adding new inline prompts to a program development environment. In one aspect, a method for Python programming on a handheld device is provided that includes installing a module in a Python development environment on the handheld device, wherein the module includes a definition of a new inline prompt, and adding the new inline prompt to a plurality of pre-defined inline prompts included in the Python development environment.

In one aspect, a digital device is provided that includes a non-transitory computer-readable medium storing software instructions for a program development environment, wherein the software instructions include software instructions to install a module in the program development environment on the digital device, wherein the module includes a definition of a new inline prompt, and add the new inline prompt to a plurality of pre-defined inline prompts included in the program development environment, and at least one processor coupled to the non-transitory computer-readable medium to execute the software instructions.

In one aspect, a method is provided that includes installing a module in a menu driven program development environment on a digital device, wherein the module includes a definition of a new inline prompt and a definition of a new menu using the inline prompt, adding the new inline prompt to a plurality of pre-defined inline prompts included in the program development environment, and adding the new menu to a menu structure of the program development environment.

DETAILED DESCRIPTION

Figures 1, 2:
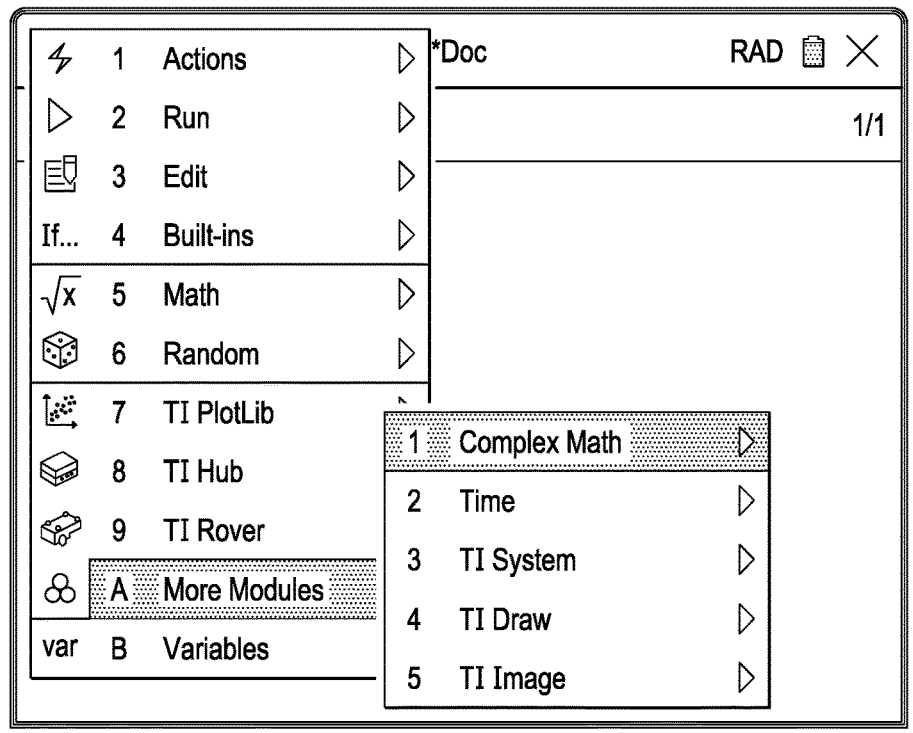
FIG. 1 illustrates the menu structure of an example Python development environment.
FIGS. 2-12 are examples illustrating inline prompts and dynamic menu definition in the example Python development environment.

Specific embodiments of the disclosure are described herein in detail with reference to the accompanying figures. Like elements in the various figures are denoted by like reference numerals for consistency.

The Python development environment available on handheld devices such as, for example, the TI-Nspire® CX II graphing calculator, includes an editor that is primarily menu driven. This menu-driven approach to Python coding helps users avoid spelling mistakes and syntax errors. Further, a user can use the menus to discover desired Python functions rather than having to memorize and hand-type the function. User selection of a Python function from a menu cause a text string of the function with any parameters to be pasted in the editor screen for inclusion in a program under development. The user can then enter values for the displayed parameters.

The Python development environment includes a library of built-in modules which are made available to the user in the Python editor via the menu structure. In general, a module is a grouping of related functions, classes, and variables. A module may also include executable code for initializing the module. As shown in the menu structure of FIG. 1, the Python development environment on the TI-Nspire® CX II graphing calculator includes standard Python modules such as math, complex math, time and random. The Python development environment also includes several additional modules, such as, for example, modules that enable Python programs to interact with variables and applications of the graphing calculator (TI System), to plot graphs from Python programs (TI Plotlib), to draw geometry graphics (TI Draw), and to process images (TI Image).

The Python editor also provides built-in templates (Built-ins) that allow a user to select and paste templates of commonly used Python statements in a program under development. Such templates may include, for example, templates for function definition, control statements such as conditional statements and iteration statements, common operations such as setting a variable value and variable comparisons, etc.

Many of Python functions included in the modules and the built-in templates provided in the editor menus include inline prompts for parameters, variables, etc. In general, an "inline prompt" is a string of characters that is displayed in the editor screen in a different way from other source code, e.g., a different color or font, and is intended to give the user a hint as to what should be entered to replace the string. For example, as shown in the editor screen of FIG. 2, a user has selected a "for" control template with three inline prompts 200, 202, 204. In this example, the names of the prompts themselves provide hints to the user of what should be entered.

Figure 3A:
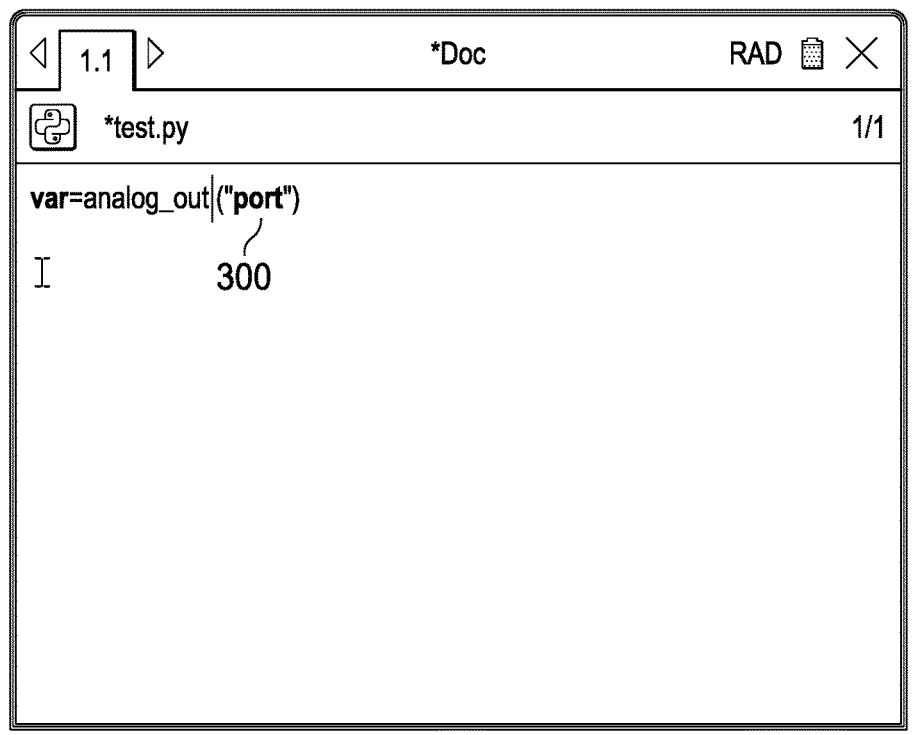
Figure 3B:
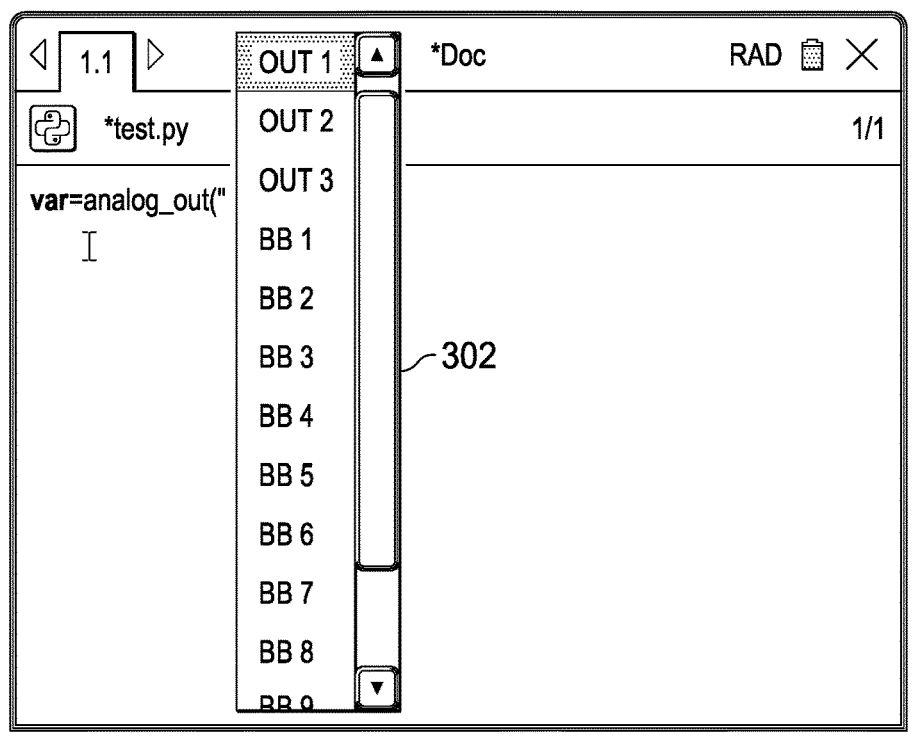

Additional information may be associated with some inline prompts. For example, an inline prompt may have an associated "pick list" of valid values for the parameter. When the editor cursor is placed on such an inline prompt, the editor displays a popup menu listing these valid values for selection by the user. FIGS. 3A and 3B are an example illustrating an inline prompt with a pick list. In this example, the inline prompt "port" 300 has an associated pick list of valid values for port. When a user moves the cursor over the inline prompt 300, a popup menu 302 with the pick list is displayed. While not specifically shown, when the user selects a value in the pick list, the selected value will replace "port" in the edit screen.

Figure 4:
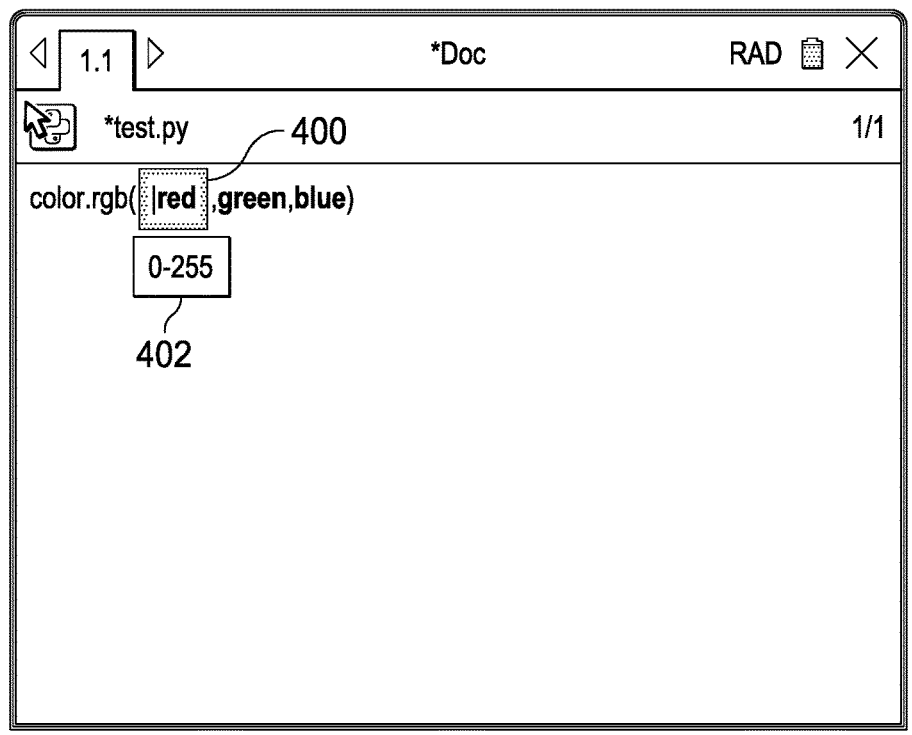

In another example, an inline prompt may have an associated tool tip. A tool tip is a textual hint regarding what value a user should enter. When the editor cursor is placed on such an inline prompt, the editor displays the tool tip near the inline prompt. FIG. 4 is an example illustrating an inline prompt with an associated tool tip. In this example, the inline prompt "red" 400 has an associated tool tip 402 showing the range of valid numeric values for the value of the "red" parameter. While not specifically shown, when the user starts entering a value for "red", the string "red" is replaced by the value the user enters.

To allow the content of a new module, e.g., a user defined module or a module provided as a product update, to be added to the menu structure, the Python development environment includes support to define "dynamic menus" for a module that are added to the Python editor menu structure when the module is installed in the Python development environment. In some embodiments, dynamic menus are defined using a series of tags. Dynamic menu tags in accordance with one or more embodiments are shown in Table 1. Further, inline prompts recognized by the Python editor are made available to be used in dynamic menu definitions and the ability to define new inline prompts is provided. Examples of some inline prompts recognized by the Python editor that may be used in dynamic menu definitions are shown in Table 2. In Table 2, the tag is a mnemonic for the inline prompt that is used to specify the inline prompt in a menu definition. Each mnemonic is associated with an inline prompt code that is substituted for the mnemonic when the menu is installed in the Python editor menu structure.

TABLE 1

| Tag | Description |
| --- | --- |
| #MENUMODULE | Identifies the entire menu structure. The "arguments" of this tag is the name of the module menu structure that will appear in the editor menus.<br>Syntax: #MENUMODULE [Module Name] |
| #MENUGROUP_BGN | Marks the beginning of a menu group, i.e., a submenu. A menu group can contain menuitems and/or additional menu groups.The "arguments" of this tag is the menu name that will appear in module menu structure.<br>Syntax: #MENUMODULE [Group Name] |
| #MENUGROUP_END | Marks the end of a menu group defined by a preceding #MENUGROUP_BGN. |
| #MENUITEM | Defines the string to be pasted in the editor screen when the menu item is selected. The "arguments" of this tag are the menu item name that will appear in the module menu structure, the paste item name (string) that will be pasted in the editor if the menu item is selected, and the argument string for the paste item name. Both the menu item name and the argument string may include inline prompts.<br>Syntax: #MENUITEM [Menu Item Name]|[Paste Item Name]([Argument]) |

Although the inline prompts may include more than one character, the editor treats such prompts as a single character. That is, when the cursor is on the inline prompt, the entire text corresponding to the inline prompt is selected and any text entered at the cursor location automatically replaces the entire inline prompt in the editor screen. In some embodiments, inline prompts are also implemented as single characters. That is, each character is encoded as two bytes. A Unicode private use area (PUA) in the two byte character encoding is used to encode the inline prompts. A PUA is a range of code points that will not be assigned characters by the Unicode Consortium. Three PUAs are defined in Unicode and the PUA in the basic multilingual plane (0xE000-0xF8FF) is used to encode the inline prompts.

A two-byte code between 0xE000 and 0xF8FF is assigned to each defined inline prompt and a replacement string is associated with each two-byte code. A replacement string is the string that the editor displays whenever the two byte code is detected. For example, in FIG. 2, the string "index" 200 may be associated with the inline prompt code 0xE008. Tool tip text and pick lists may also be associated with an inline prompt code and displayed by the editor as previously described herein.

TABLE 2

| Tag | Replacement String | Tooltip Text | Pick List |
| --- | --- | --- | --- |
| <%ANGLE%> | angle | degrees | no |
| <%ARGUMENT%> | argument | no text | no |
| <%BLUE%> | blue | 0-255 | no |
| <%BOOLEANEXPR%> | BooleanExpr | no text | no |
| <%DISTANCE%> | distance | grid units | no |
| <%FREQ%> | frequency | 0.1-20 Hz | no |
| <%FREQT%> | frequency | 0-8000 Hz | |
| <%GREEN%> | green | 0-255 | no |
| <%INDEX%> | index | no text | no |
| <%INTEGER%> | integer | no text | no |
| <%ITEM%> | item | no text | no |
| <%MAX%> | max | no text | no |
| <%MIN%> | min | no text | no |
| <%MSECS%> | milliseconds | no text | no |
| <%PENST%> | style | no text | yes |
| <%PENSZ%> | size | no text | yes |
| <%POS%> | pos | +-90 | no |
| <%RADIUS%> | radius | no text | no |
| <%RED%> | red | 0-255 | no |

TABLE 2-continued

| Tag | Replacement String | Tooltip Text | Pick List |
|---|---|---|---|
| <%ROW%> | row | no text | no |
| <%ROWNUM%> | row | 1-13 | no |
| <%SCALEV%> | scale_value | m/unit | no |
| <%SECONDS%> | seconds | no text | no |
| <%SEQUENCE%> | sequence | no text | no |
| <%SIZE%> | size | no text | no |
| <%TITLE%> | title | no text | no |
| <%TYPE%> | type | no text | yes |
| <%VALUE%> | value | no text | no |
| <%VALUE255%> | value | 0-255 | no |
| <%VAR%> | var | no text | no |
| <%WIDTH%> | width | no text | no |

Figure 5:
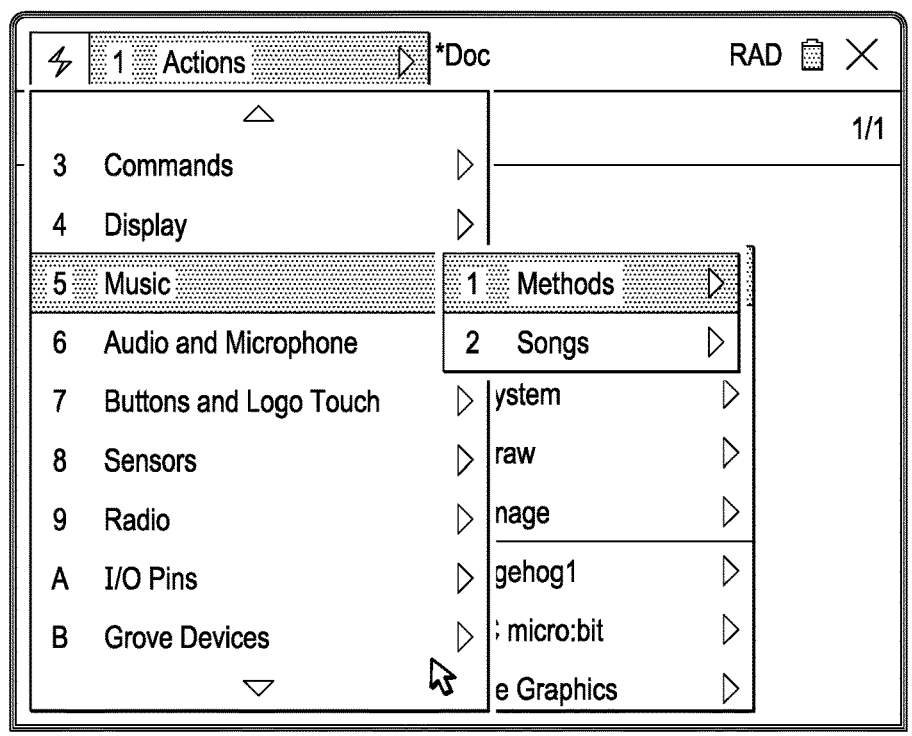
Figure 6:
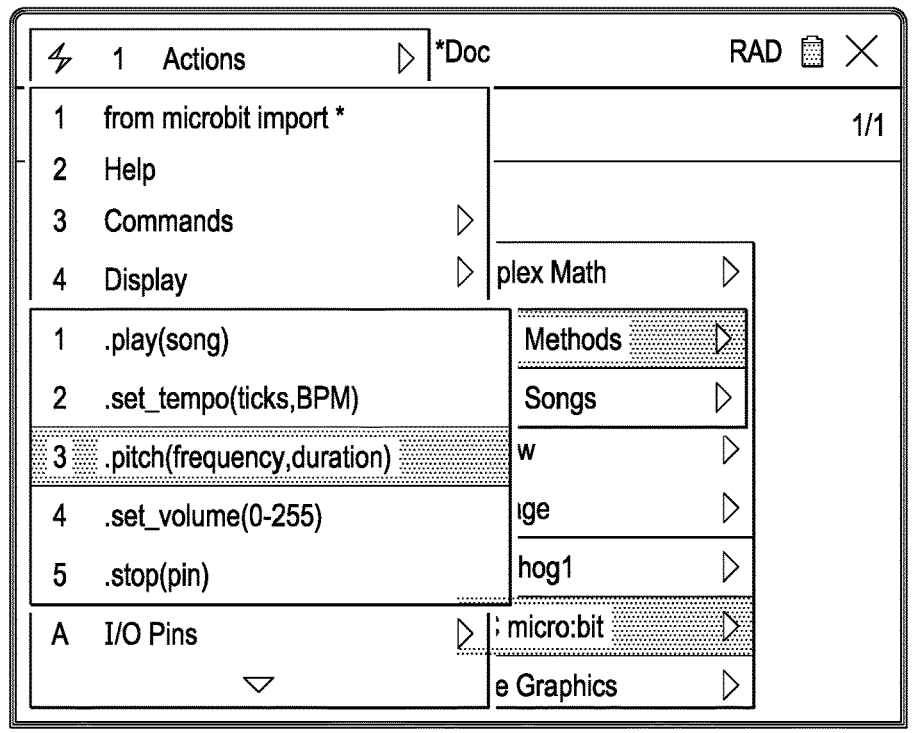
Figure 7:
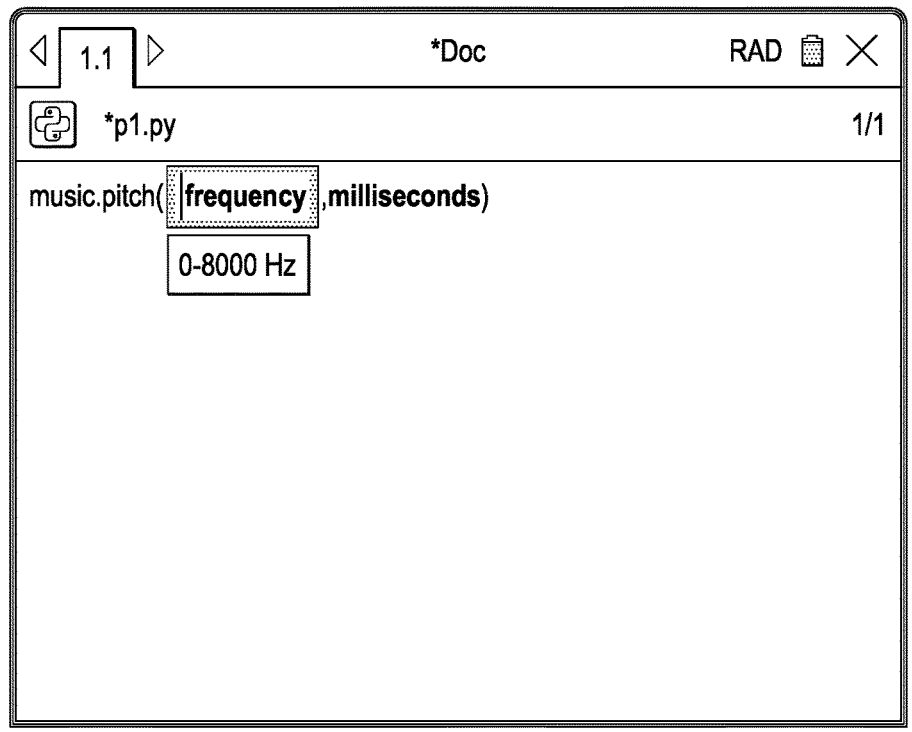

Table 3 is an example of a dynamic menu definition for a module named Music. This dynamic menu definition defines a menu group "Music" with two menu groups "Methods" and "Songs". Further, the menu group "Methods" includes five menu items corresponding to five methods defined in the module. Note that in each menu item, the argument string following each paste item name includes at least one inline prompt from Table 2. For the sake of brevity in this example, the content of the menu group "Songs" is not shown. FIG. 5 shows the top level menu structure for the Music menu generated by this dynamic menu definition. FIG. 6 shows the Methods menu generated by this dynamic menu definition. FIG. 7 shows the string pasted into the Python editor screen when the .pitch(frequency,duration) menu item is selected.

TABLE 3

```
#MENUGROUP_BGN Music
#MENUGROUP_BGN Methods
#MENUITEM .play(song)|music.play(<%VALUE%>)
#MENUITEM .set_tempo(ticks,BPM)|music.set_tempo(<%VALUE%>,<%VALUE%>)
#MENUITEM .pitch(frequency,duration)|music.pitch(<%FREQT%>,<%MSECS%>)
#MENUITEM .set_volume(0-255)|music.set_volume(<%VALUE255%>)
#MENUITEM .stop(pin)|music.stop(<%VALUE%>)
#MENUGROUP_END
#MENUGROUP_BGN Songs
...
#MENUGROUP_END
#MENUGROUP_END
```

Figure 8:
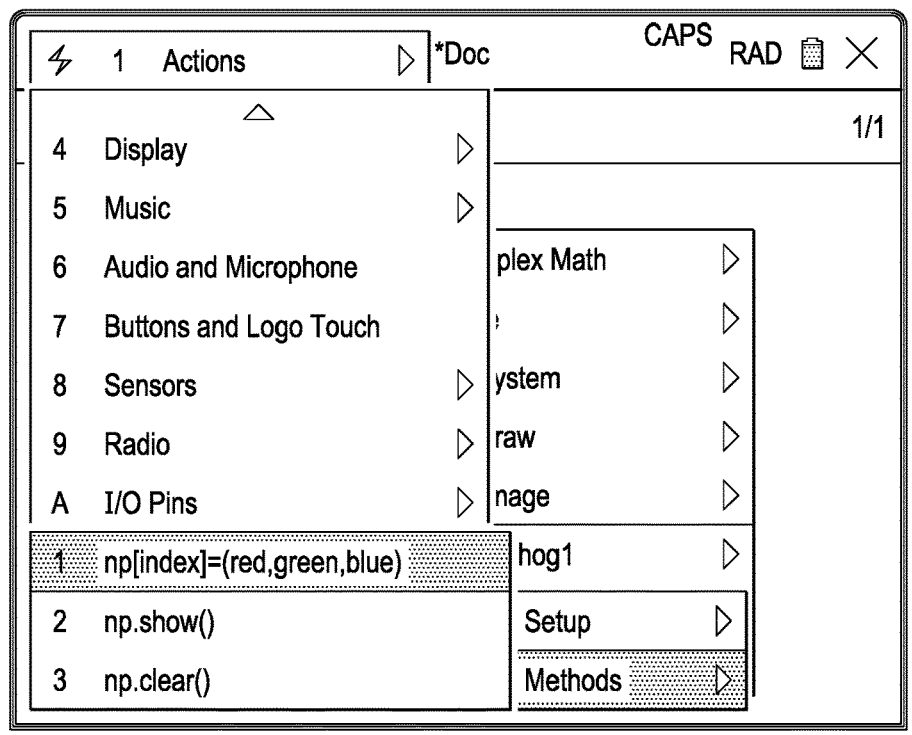
Figure 9:
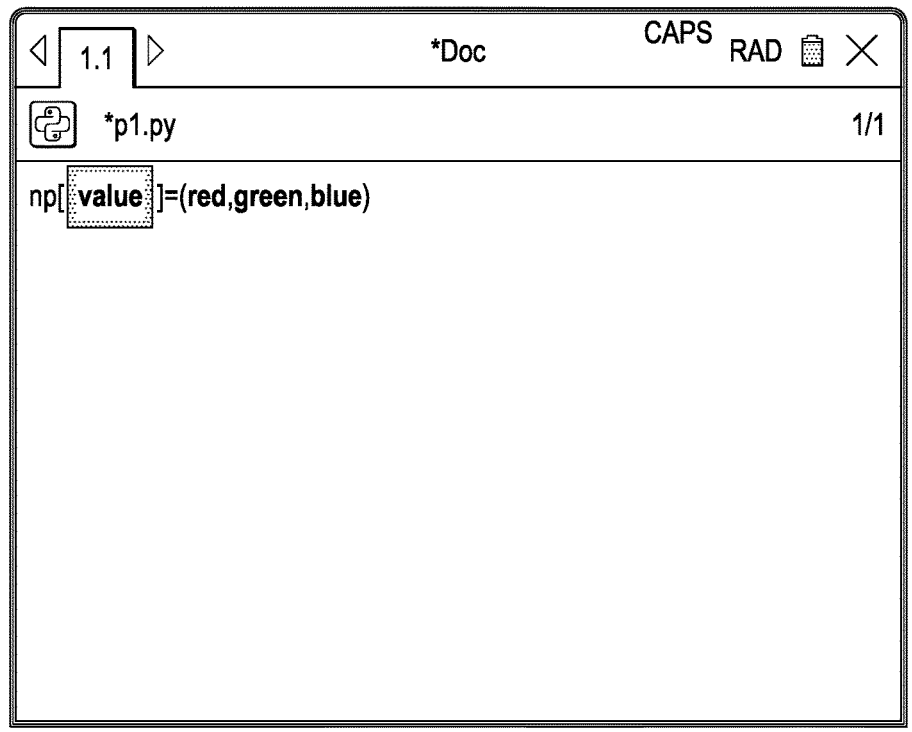

Table 4 is an example of a dynamic menu definition that creates a menu to control a tri-color (red, green, blue) LED. The module containing the dynamic menu definition, referred to as "np" in the definition, includes Python methods for controlling a string of NeoPixel colorful light emitting diodes (LEDs). This dynamic menu definition defines a menu group "Methods" that includes three menu items corresponding to three methods defined in a module. Note that the first menu item definition includes four inline prompts from Table 2. FIG. 8 shows the Methods menu generated by this dynamic menu definition. FIG. 9 shows the string pasted into the Python editor screen when the np[index]=(red,green,blue) menu item is selected.

TABLE 4

```
#MENUGROUP_BGN Methods
#MENUITEM np[index]=(red,green,blue)|np[<%VALUE%>]=
   (<%RED%>,<%GREEN%>,<%BLUE%>)
#MENUITEM np.show( )|np.show0
#MENUITEM np.clear( )|np.clear( )
#MENUGROUP_END
```

As was previously mentioned herein, the ability to define new inline prompts with tooltips or picklists is included along with the ability to define dynamic menus. In some embodiments, the syntax for defining a new inline prompt without a tooltip or pick list is <% NEW_PROMPT %><% PROMPT_NAME %>"replacement string". In this syntax, the PROMPT_NAME argument is the name of the new prompt to be used in menu definitions and "replacement string" is the string to be displayed in the editor screen. To specify a tooltip, <tooltip:text> can be appended where "text" is the text to be displayed. To specify a pick list for a new inline prompt, <picklist:list> can be appended where "list" is a comma separated listing of the pick list items. For example, if a new drawing module with a function for "speed" is to be added, a new prompt for the function can be defined as:

<% NEW_PROMPT %><% DRAWING_SPEED %>"speed"<tooltip:range 1-10>.

Given the above definition, the user can use <% DRAWING_SPEED %> as a new inline prompt in a dynamic menu definition in the same manner as a pre-defined inline prompt.

Figure 10:
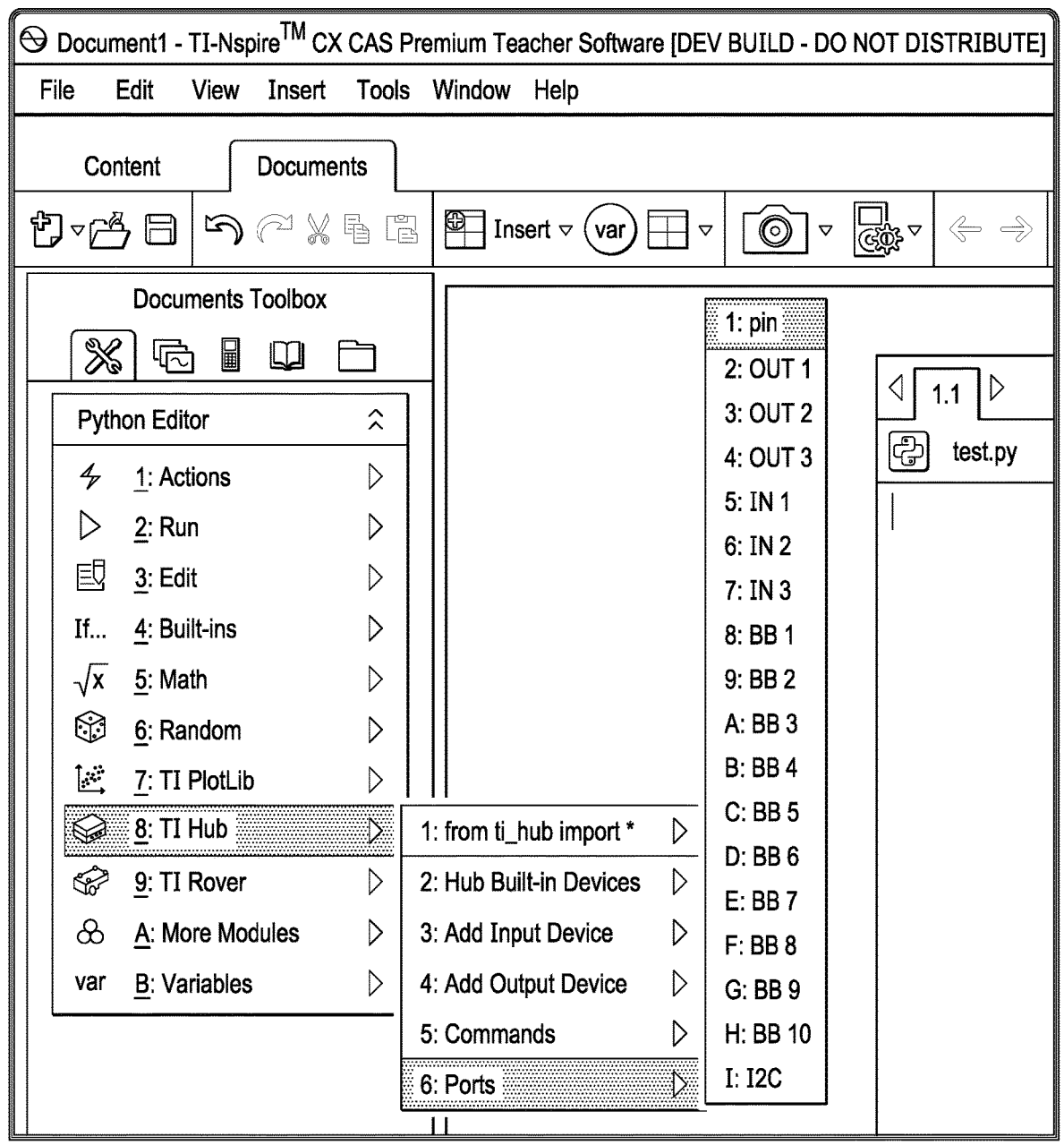
Figure 11:
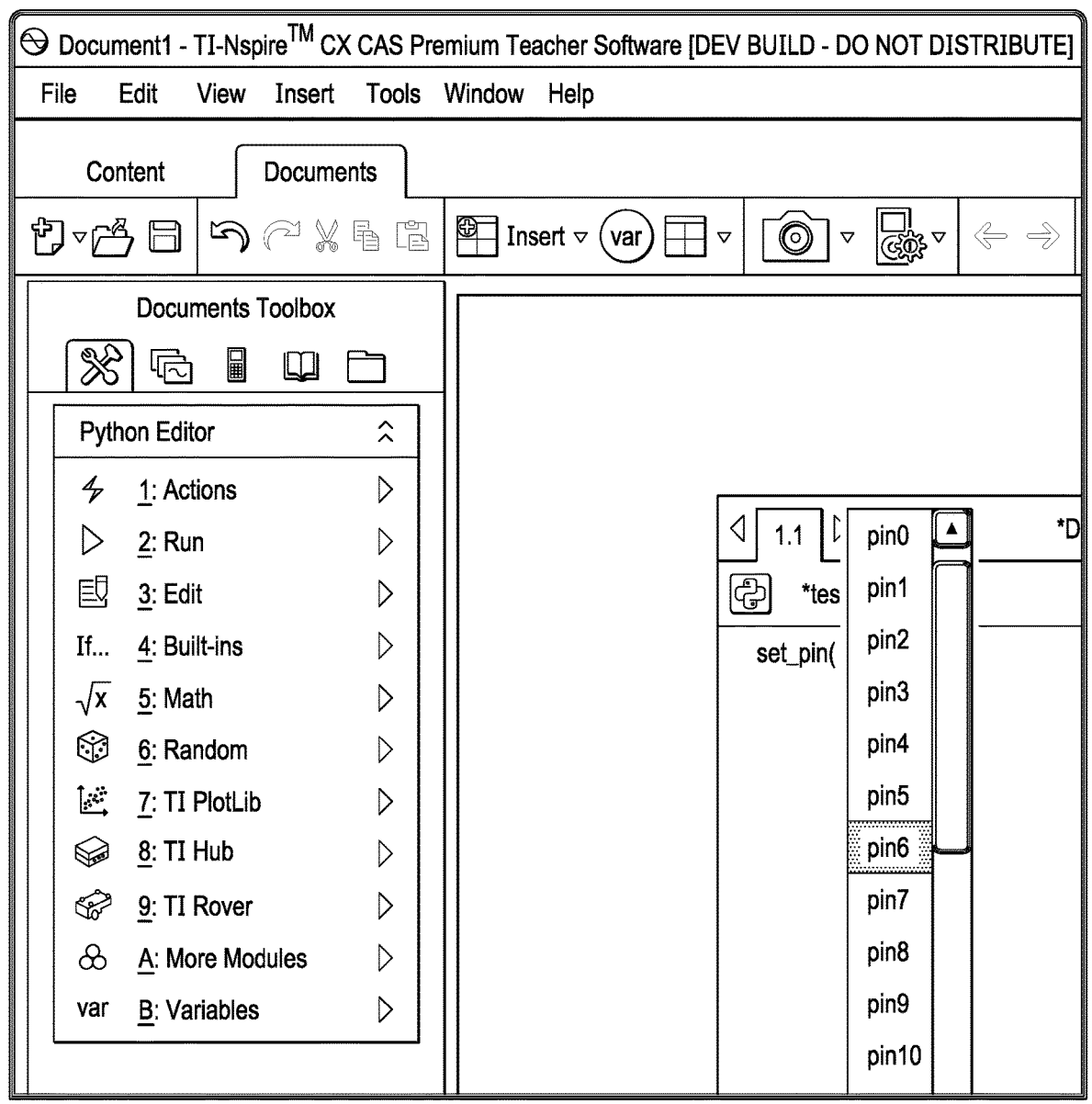
Figure 12:
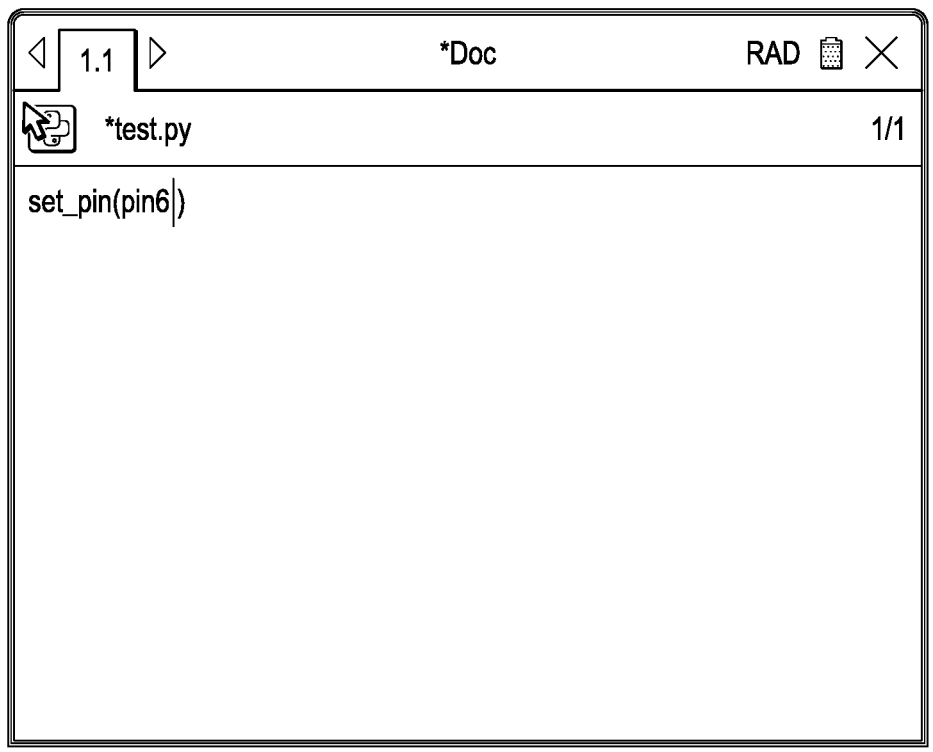

Table 5 is an example of a dynamic menu definition with an accompanying definition of a new inline prompt <% MBPINS %> with a pick list. The menu creates a menu group "Ports" that includes a menu item definition referencing the new inline prompt. For the sake of brevity in this example, additional menu item definitions are not shown. In some embodiments, an unused two byte value is selected to represent the new inline prompt when the dynamic menu definition is processed in the Python development environment. FIG. 10 shows the Ports menu generated by this menu definition. FIG. 11 shows the string pasted into the Python editor screen when the pin menu item is selected along with the popup menu for the pick list specified for the new inline prompt. FIG. 12 shows the contents of the Python editor screen after the value pin6 is selected from the pick list.

TABLE 5

```
#<%NEW_PROMPT%><%MBPINS%>"pin"<picklist:pin0,pin1,pin2,pin3,pin4,pin5,
    pin6,pin7,pin8,pin9,pin10,pin11,pin12,pin13,pin14,pin15 >
#MENUGROUP_BGN Ports
#MENUITEM pin|set_pin(<%MBPINS%>)
.... Other menu items
#MENUGROUP_END
```

Figure 13:
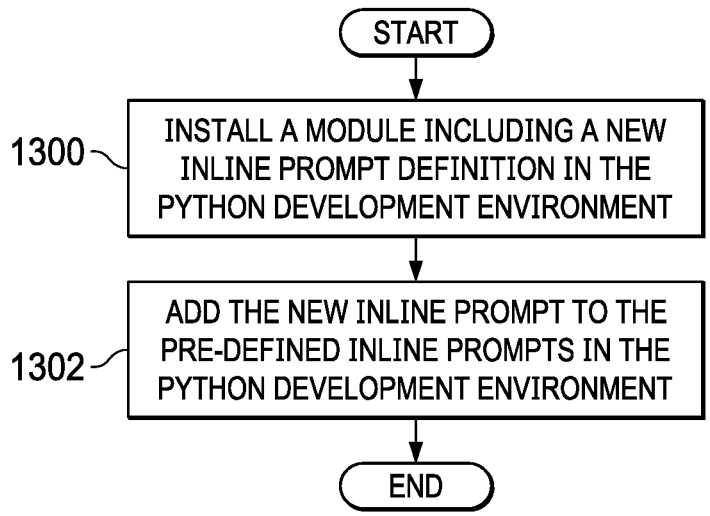
FIG. 13 is a flow diagram of a method for adding a new inline prompt to a Python program editor executing on a handheld device.

FIG. 13 is a flow diagram of a method for adding/installing a new inline prompt to a Python development environment. Initially, a module that includes a new inline prompt definition is installed 1300 in the Python development environment. The new inline prompt is then added 1302 to the pre-defined inline prompts included in the Python development environment.

Figure 14:
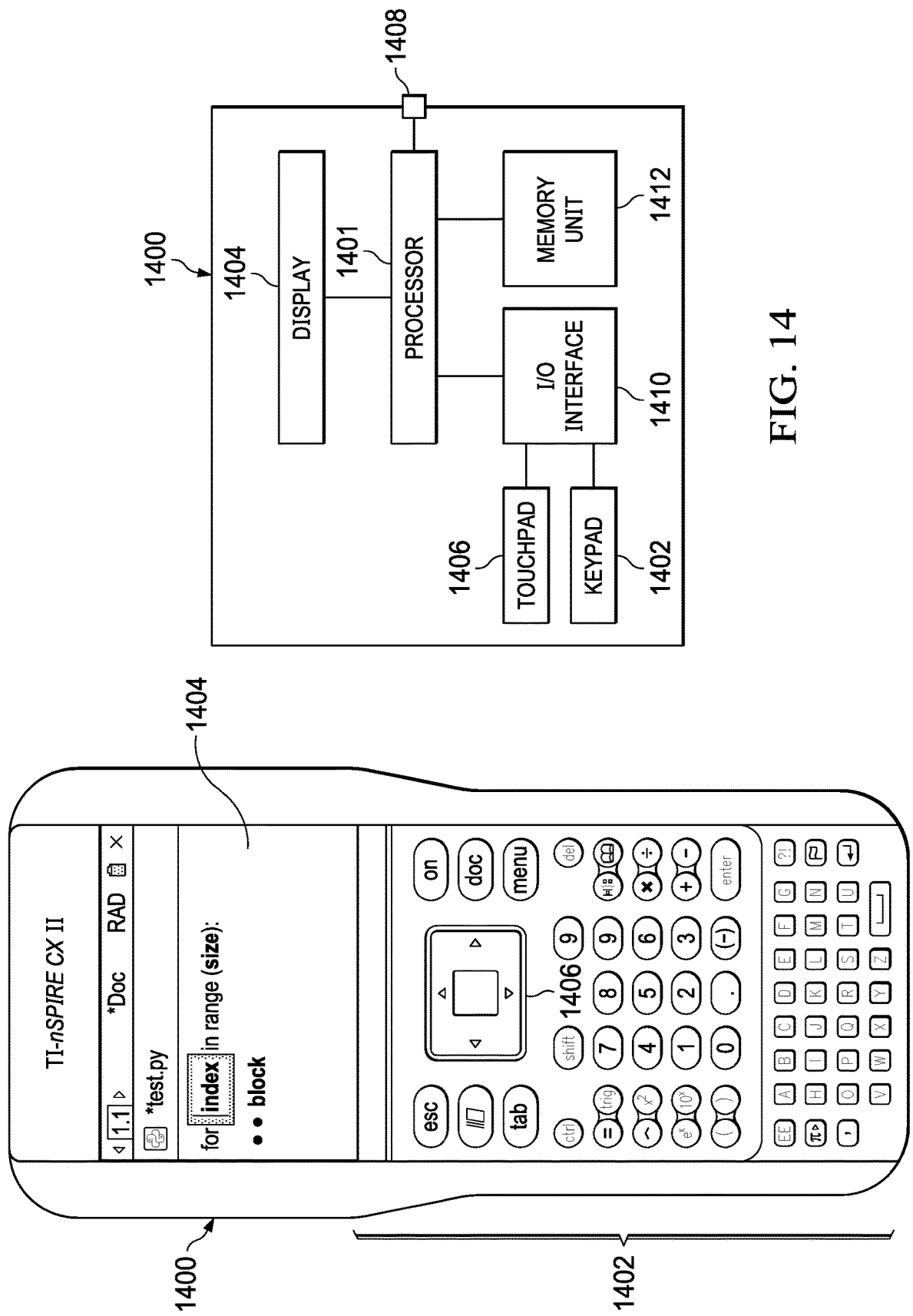
FIG. 14 is a block diagram of an example handheld device.

Embodiments described herein can be implemented on any suitably configured handheld device, e.g., a handheld graphing calculator, providing Python programming functionality. FIG. 14 is an example of a handheld graphing calculator 2700, i.e., TI-Nspire® CX II graphing calculator, configured to provide dynamic menus and new inline prompts as described herein. The handheld calculator 1400 includes a display screen 1404, and a keypad 1402 that includes a touchpad 1406. The display screen 1404 can be used to display, among other things, information input to applications executing on the handheld graphing calculator 1400 and various outputs of the applications. For example, the display screen 1404 may be used to display the screens of a Python program editor as described herein. The display screen 1404 may be, for example, an LCD display.

The keypad 1402 allows a user to enter data and commands and to start and interact with applications executing on the handheld graphing calculator 1400. The keypad 1402 also includes an alphabetic keyboard for entering text. The touchpad 1406 allows a user to interact with the display 1404 by translating the motion and position of the user's fingers on the touchpad 1406 to provide functionality similar to using an external pointing device, e.g., a mouse. A user may use the touchpad 1406 to perform operations similar to using a pointing device on a computer system, e.g., scrolling the display 1404 content, pointer positioning, selecting, highlighting, etc.

The handheld graphing calculator 1400 includes a processor 1401 coupled to a memory unit 1412, e.g., a non-transitory computer-readable medium, which may include one or both of memory for program storage, e.g., read-only memory (ROM), and memory for non-persistent data and program storage, e.g., random-access memory (RAM). In some embodiments, the program storage memory stores software programs and the memory for non-persistent data stores intermediate data and operating results. An input/output port 1408 provides connectivity to external devices, e.g., a wireless adaptor or wireless cradle. In one or more embodiments, the input/output port 1408 is a bi-directional connection such as a mini-A USB port. Also included in the handheld graphing calculator 1400 is an I/O interface 1410. The I/O interface 1410 provides an interface to couple input devices such as the touchpad 1406 and the keypad 1402 to the processor 1401. In some embodiments, the handheld calculator 1400 may also include an integrated wireless interface (not shown) or a port for connecting an external wireless interface (not shown).

In one or more embodiments, the memory unit 1412 stores software instructions to be executed by the processor 1401 to perform embodiments of defining dynamic menus and new inline prompts as described herein. Further, in some such embodiments, the memory unit 1412 stores software instructions of an operating system and other functionality that support such embodiments on the handheld graphing calculator 1400. One example of such software is that available on the TI-Nspire™ series of graphing calculators available from Texas Instruments, Inc.

Figure 15:
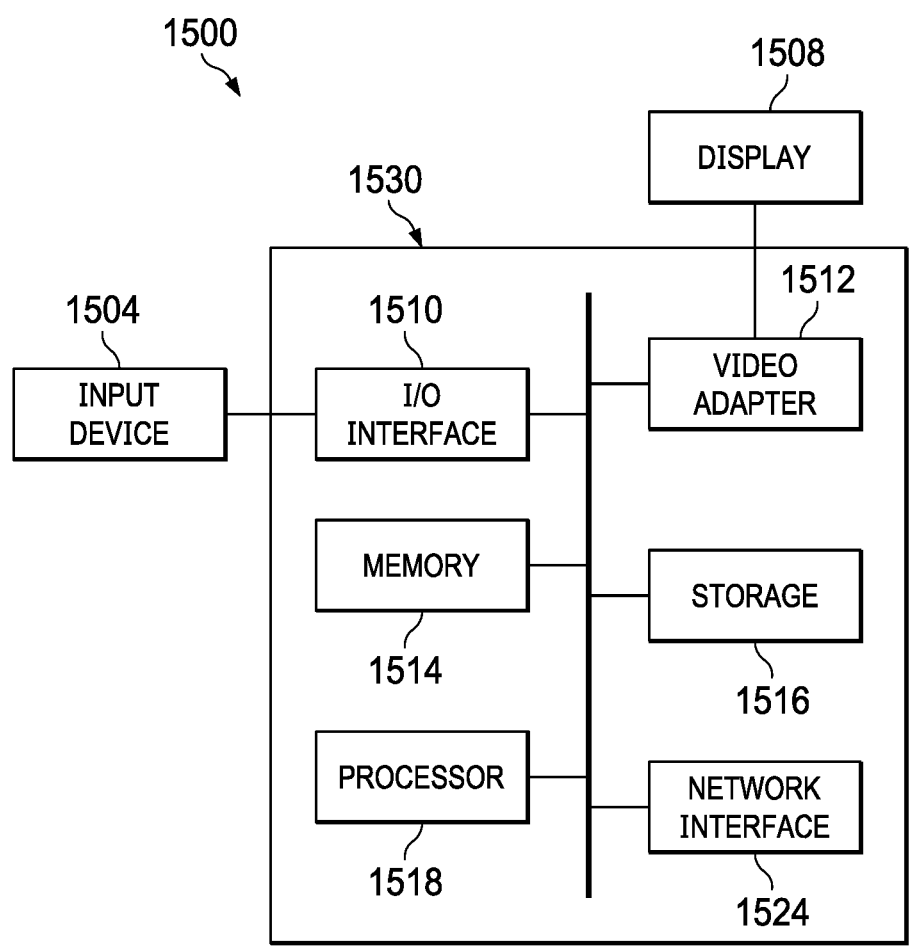
FIG. 15 is a block diagram of an example digital device.

Embodiments described herein can be implemented on any suitably configured digital device providing Python programming functionality. FIG. 15 is an example of a digital device 1500 configured to provide dynamic menus and new inline prompts as described herein. The digital device 1500 includes a processing unit 1530 coupled to one or more input devices 1504 (e.g., a mouse, a keyboard, or the like), and one or more output devices, such as a display screen 1508. In some embodiments, the display screen 1508 may be touch screen, thus allowing the display screen 1508 to also function as an input device. The processing unit 1530 may be, for example, a desktop computer, a workstation, a laptop computer, a tablet, a dedicated unit customized for a particular application, or the like. The display screen 1508 may be any suitable visual display unit such as, for example, a computer monitor, an LED, LCD, or plasma display, a television, a high definition television, or a combination thereof. The display screen 1508 can be used, for example, to information input to applications executing on the processing unit 1530 and various outputs of the applications. For example, the display screen 1508 may be used to display the screens of a Python editor as described herein.

The processing unit 1530 includes a processor 1518, memory 1514, a storage device 1516, a video adapter 1512, and an I/O interface 1510 connected by a bus. The bus may be one or more of any type of several bus architectures including a memory bus or memory controller, a peripheral bus, video bus, or the like. The processor 1518 may be any type of electronic data processor. For example, the processor 1518 may be a processor from Intel Corp., a processor from Advanced Micro Devices, Inc., a Reduced Instruction Set Computer (RISC), an Application-Specific Integrated Circuit (ASIC), or the like. The memory 1514, e.g., a non-transitory computer-readable medium, can be any type of system memory such as static random access memory (SRAM), dynamic random access memory (DRAM), synchronous DRAM (SDRAM), read-only memory (ROM), a combination thereof, or the like. Further, the memory 1514 can include ROM for use at boot-up, and DRAM for data storage for use while executing programs.

The storage device 1516, e.g., a non-transitory computer-readable medium, can include any type of storage device configured to store data, programs, and other information and to make the data, programs, and other information accessible via the bus. In one or more embodiments, the storage device 1516 stores software instructions to be executed by the processor 1518 to perform embodiments of defining dynamic menus and new inline prompts described herein. In some such embodiments, the memory unit 1514 stores software instructions of teacher and student software that emulates a handheld device that may include functionality supporting embodiments of defining dynamic menus and new inline prompts as described herein. Examples of such teacher and student software are the TI-Nspire™ CX Premium Teacher Software and the TI-Nspire™ CX Student Software, both available from Texas Instruments, Inc.

The video adapter 1512 and the I/O interface 1510 provide interfaces to couple external input and output devices to the processing unit 1530. The processing unit 1530 also includes a network interface 1524. The network interface 1524 allows the processing unit 1530 to communicate with remote units via a network (not shown). The network interface 1524 may provide an interface for a wired link, such as an Ethernet cable or the like, or a wireless link. The digital device 1500 may also include other components not specifically shown. For example, the digital device 1500 may include power supplies, cables, a motherboard, removable storage media, cases, and the like.

Other Embodiments

While the disclosure has been described with respect to a limited number of embodiments, those skilled in the art, having benefit of this disclosure, will appreciate that other embodiments can be devised which do not depart from the scope disclosed herein.

For example, embodiments have been described herein in which the dynamic menu definitions are described in the context of a Python editor. In some embodiments, a Python shell in the Python development environment is also menu driven in a similar manner to the Python editor and uses the same menu structure as the Python editor.

In another example, embodiments have been described herein in which pre-defined and new inline prompts are associated with two byte character codes. In some embodiments, other approaches to implementing the inline prompts may be used. For example, any association of one string of characters with a replacement string can be used as a framework for inline prompts, as long as the character strings associated with inline prompts are unlikely to appear in regular source code. For instance, any word ending in "$%'" could be an inline prompt associated with a replacement string. When the editor encounters such a word, the editor would render the word as the associated replacement string.

In another example, embodiments have been described herein in reference to the Python programming language and a menu driven approach for developing programs in Python in an editor. A menu driven approach to program development in accordance with embodiments described herein can be used for other programming languages, e.g., Basic, Java, Javascript, etc. For example, a menu driven program development environment is provided for Basic on some graphing calculators. Such development environments may be extended to include dynamic menu definitions, predefined inline prompts, and the ability to add new inline prompts as described herein.

Software instructions implementing all or portions of embodiments of defining dynamic menus and new inline prompts as described herein may be initially stored in a non-transitory computer-readable medium and loaded and executed by one or more processors. In some cases, the software instructions may be distributed via removable non-transitory computer-readable media, via a transmission path from non-transitory computer-readable media on another digital system, etc. Examples of non-transitory computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the disclosure.

What is claimed is:

1. A method for Python programming on a handheld device, the method comprising:
    installing a module in a Python development environment on the handheld device, wherein:
        the Python development environment includes a set of menu tags and a set of inline prompts;
        each of the set of inline prompts is associated with a unique two byte code having a value between 0xE000 and 0xF8FF;
        a set of remaining two byte code values includes values between 0xE000 and 0xF8FF that are not assigned to one of the set of inline prompts;
        the Python development environment includes a first inline prompt defined based on a first one of the set of menu tags and a first one of the set of inline prompts;
        the module includes a definition of a second inline prompt;
        the second inline prompt is associated with a unique two byte code in the set of remaining two byte code values; and
        the second inline prompt is different from the first inline prompt;
    adding the second inline prompt to the first inline prompt to form a set of inline prompts;
    displaying a first menu group, wherein the first menu group includes a first menu item definition associated with the first inline prompt; and
    displaying a second menu group, wherein the second menu group includes a second menu item definition associated with the second inline prompt.

2. The method of claim 1, wherein the definition of the second inline prompt comprises a tooltip for the second inline prompt.

3. The method of claim 1, wherein the definition of the second inline prompt comprises a pick list for the second inline prompt.

4. The method of claim 1, wherein the definition of the second inline prompt comprises a name for the second inline prompt and a replacement string for the second inline prompt.

5. The method of claim 4, wherein installing further comprises adding a menu for the module to a menu structure comprised in the Python development environment, wherein the module comprises a definition of the menu, and wherein the definition of the menu comprises a definition of a menu item comprising the second inline prompt.

6. The method of claim 5, further comprising:
    displaying the menu on a display screen comprised in the handheld device;
    receiving user selection of the menu item; and
    pasting, responsive to the user selection, a string comprised in the definition of the menu item on the display screen, wherein the string comprises the second inline prompt in the definition of the menu item, and wherein the second inline prompt is replaced by the replacement string.

7. The method of claim 6, further comprising:
    replacing the replacement string with a value input by a user.

8. The method of claim 7, wherein replacing further comprises displaying a pick list associated with the second inline prompt, wherein the user selects the value from the pick list.

9. The method of claim 1, wherein the handheld device is emulated on a digital device.

10. A digital device comprising:
a non-transitory computer-readable medium storing software instructions for a program development environment which, when executed by at least one processor of a digital device, direct the digital device to:
install a module in the program development environment on the digital device, wherein:
the program development environment includes a set of menu tags and a set of inline prompts;
each of the set of inline prompts is associated with a unique two byte code having a value between 0xE000 and 0xF8FF;
a set of remaining two byte code values includes values between 0xE000 and 0xF8FF that are not assigned to one of the set of inline prompts;
the program development environment includes a first inline prompt defined based on a first one of the set of menu tags and a first one of the set of inline prompts;
the module includes a definition of a second inline prompt;
the second inline prompt is associated with a unique two byte code in the set of remaining two byte code values; and
the second inline prompt is different from the first inline prompt;
add the second inline prompt to the first inline prompt to form a set of inline prompts;
display a first menu group, wherein the first menu group includes a first menu item definition referencing the first inline prompt; and
display a second menu group, wherein the second menu group includes a second menu item definition referencing the second inline prompt.

11. The digital device of claim 10, wherein the definition of the second inline prompt comprises a tooltip for the second inline prompt.

12. The digital device of claim 10, wherein the definition of the second inline prompt comprises a pick list for the second inline prompt.

13. The digital device of claim 10, wherein the definition of the second inline prompt comprises a name for the second inline prompt and a replacement string for the second inline prompt.

14. The digital device of claim 13, wherein the software instructions to install further comprise software instructions to add a menu for the module to a menu structure comprised in the program development environment, wherein the module comprises a definition of the menu, and wherein the definition of the menu comprises a definition of a menu item comprising the second inline prompt.

15. The digital device of claim 14, wherein the software instructions further comprise software instructions to:
display the menu on a display screen coupled to the digital device;
receive user selection of the menu item; and
paste, responsive to the user selection, a string comprised in the definition of the menu item on the display screen, wherein the string comprises the second inline prompt in the definition of the menu item, and wherein the second inline prompt is replaced by the replacement string.

16. The digital device of claim 15, wherein the software instructions further comprise software instructions to:
replace the replacement string with a value input by a user.

17. The digital device of claim 16, wherein the software instructions further comprise software instructions to display a pick list associated with the second inline prompt and to receive user selection of the value from the pick list.

18. The digital device of claim 10, wherein the digital device is a handheld device.

19. The digital device of claim 10, wherein the program development environment is a Python development environment.

20. A method comprising:
installing a module in a menu driven program development environment on a digital device, wherein:
the menu driven program development environment includes a set of menu tags and a set of inline prompts;
each of the set of inline prompts is associated with a unique two byte code having a value between 0xE000 and 0xF8FF;
a set of remaining two byte code values includes values between 0xE000 and 0xF8FF that are not assigned to one of the set of inline prompts;
the menu driven program development environment includes a first inline prompt used by a first menu of a menu structure of the menu driven program development environment, the first inline prompt defined based on a first one of the set of menu tags and a first one of the set of inline prompts;
the module includes a definition of a second inline prompt and a definition of a second menu using the second inline prompt;
the second inline prompt is associated with a unique two byte code in the set of remaining two byte code values; and
the second inline prompt is different from the first inline prompt;
adding the second inline prompt to the first inline prompt to form a set of inline prompts;
adding the second menu to the menu structure of the program development environment;
displaying the first menu, wherein the first menu includes a first menu item definition referencing the first inline prompt; and
displaying the second menu, wherein the second menu includes a second menu item definition referencing the second inline prompt.

21. The method of claim 20, wherein the definition of the second inline prompt comprises a tooltip for the second inline prompt.

22. The method of claim 20, wherein the definition of the second inline prompt comprises a pick list for the second inline prompt.

23. The method of claim 20, further comprising:
displaying the second menu on a display screen comprised in the digital device;
receiving user selection of a menu item in the second menu comprising the second inline prompt; and
pasting, responsive to the user selection, a string comprising the second inline prompt in a screen of the digital device.

24. The method of claim 23, further comprising:
replacing the second inline prompt with a value input by a user.

25. The method of claim 24, wherein replacing further comprises displaying a pick list associated with the second inline prompt, wherein the user selects the value from the pick list.

* * * * *